(12) United States Patent
McCormick, Jr.

(10) Patent No.: US 6,622,209 B2
(45) Date of Patent: Sep. 16, 2003

(54) USE OF NON-COUNT DATA AND INDEX HASHING TO REDUCE FALSE HITS IN A NON-TAGGED, N-WAY CACHE

(75) Inventor: James E McCormick, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/262,376

(22) Filed: Sep. 30, 2002

(65) Prior Publication Data

US 2003/0033484 A1 Feb. 13, 2003

Related U.S. Application Data

(63) Continuation of application No. 09/510,253, filed on Feb. 22, 2000, now Pat. No. 6,470,438.

(51) Int. Cl.[7] .............................................. G06F 12/00
(52) U.S. Cl. ........................ 711/118; 711/128; 711/210; 711/216; 711/108; 711/137; 711/233; 711/237; 711/240
(58) Field of Search ................................. 711/210, 216, 711/108, 128, 137, 204, 3, 125, 133, 118; 712/233–244

(56) References Cited

U.S. PATENT DOCUMENTS

| | | | |
|---|---|---|---|
| 4,860,199 A | 8/1989 | Langendorf et al. | |
| 4,894,772 A | 1/1990 | Langendorf | |
| 5,574,871 A | 11/1996 | Hoyt et al. | |
| 5,721,893 A | 2/1998 | Holler et al. | |
| 5,859,999 A | 1/1999 | Morris et al. | |
| 5,860,017 A | 1/1999 | Sharangpani et al. | |
| 5,935,241 A | * 8/1999 | Shiell et al. | ................. 712/240 |
| 5,978,909 A | * 11/1999 | Lempel | ..................... 712/240 |
| 6,108,777 A | * 8/2000 | Puziol et al. | ................. 712/240 |
| 6,115,809 A | 9/2000 | Mattson, Jr. et al. | |
| 6,205,545 B1 | 3/2001 | Shah et al. | |
| 6,247,122 B1 | 6/2001 | Henry et al. | |
| 6,351,796 B1 | * 2/2002 | McCormick, Jr. et al. | .. 711/204 |
| 6,470,438 B1 | * 10/2002 | McCormick, Jr. | ........... 711/210 |

OTHER PUBLICATIONS

James E. McCormick, Jr., "Method and Apparatus for Reducing False Hits in a Non–Tagged, N–Way Cache", U.S. Pat. App. SN 09/510,253, filed Feb. 22, 2000.

Alexander Wolfe, "Patents Shed Light on Merced", Electronic Engineering Times, Feb. 15, 1999, pp. 43–44.

Michaud et al., "Trading Conflict and Capacity Aliasing in Conditional Branch Predictors", Proceedings of the 24th Annual International Symposium on Computer Architecture, 1997, 9 pages.

Sprangle et al., "The Agree Predictor: A Mechanism for Reducing Negative Branch History Interference", Advanced Computer Architecture Laboratory, Department of Electrical Engineering and Computer Science, The University of Michigan, Jul. 1997, pp. 284–291.

* cited by examiner

Primary Examiner—Hong Kim (57) ABSTRACT

In one embodiment of the invention, data values which are provided to a non-tagged, n-way cache are written into the cache in a non-count form. Whereas a counter tends to quickly saturate to one extreme or the other (e.g., all zeros or all ones), or briefly take on a value which approaches an extreme, a non-count data value (e.g., branch prediction history bits) tends to assume a wider variety of values.

8 Claims, 6 Drawing Sheets

USE OF NON-COUNT DATA AND INDEX HASHING TO REDUCE FALSE HITS IN A NON-TAGGED, N-WAY CACHE

CROSS REFERENCE TO RELATED APPLICATIONS

This is a continuation of copending application number 09/510,253 filed on Feb. 22, 2000 (now U.S. Pat. No. 6,470,438 issued Oct. 22, 2002), which is hereby incorporated by reference herein.

FIELD OF THE INVENTION

The invention pertains to the storage of data in a cache, and more particularly to the efficient storage of prediction information such as branch prediction information in a cache. Branch prediction information is information which predicts whether an instruction of the form "branch to instruction X if condition Y is met" will require the branch to be taken or not taken.

If branch prediction is to be based on an algorithm other than "branches are always predicted taken" or "branches are always predicted not taken", some means must exist for storing branch prediction information. Frequently, such a means comprises a table of 2-bit branch prediction history counts which are respectively incremented or decremented in response to branch instructions being taken or not taken.

BACKGROUND OF THE INVENTION

Many of today's microprocessors incorporate structures known as instruction pipelines. Instruction pipelines increase the efficiency of a processor by enabling a processor to simultaneously process a plurality of instructions. Instruction pipelines can be thought of as instruction assembly lines. Instruction_0 enters the first stage of the pipeline while Instruction_1 is simultaneously processed in the second stage of the pipeline, Instruction_2 is simultaneously processed in the third stage of the pipeline, and so on. Periodically, a new instruction is clocked into the instruction pipeline, and each instruction being processed in the pipeline is passed to the next stage of the pipeline, or is output from the pipeline.

To maximize instruction execution efficiency, it is desirable to keep instruction pipelines full as often as possible (with an instruction being processed in each stage of the pipeline) such that each periodic clocking of the instruction pipeline produces a useful output. However, whenever 1) there has been a transfer of program flow control from one section of program code to another, 2) instructions have been speculatively fetched and processed, and 3) it is determined that the speculatively fetched and processed instructions should not have been processed, an instruction pipeline will produce an output that is not useful. For each clock cycle that an instruction pipeline produces an output that is not useful, the instruction pipeline has a negative impact on a processor's efficiency.

Program flow control instructions such as branch instructions are one means by which program flow control can be transferred from one section of program code to another. Branch instructions can be conditional or unconditional. A conditional branch instruction determines program flow control based on the resolution of a specified condition. An unconditional branch instruction always results in a transfer of program flow control.

"Branch to instruction X if A>B" is one example of a conditional branch instruction. If A>B, program control flow will transfer to a section of program code beginning with instruction X (i.e., a target code section). If A≦B, program control flow will continue with a section of program code which sequentially follows the conditional branch instruction (i.e., a sequential code section).

Since instruction pipelines can be several stages deep, conditional branch instructions are often fetched before the conditions specified in the branch instructions can be resolved. A processor must therefore predict whether branches will be taken or not taken. After a prediction is made, instructions are speculatively fetched from either a target code section (if a branch is predicted to be taken) or a sequential code section (if a branch is predicted to be not taken).

Although many branch prediction algorithms exist, mispredictions still occur. By the time a misprediction is identified, it is possible for an instruction pipeline to be operating on many instructions which were fetched from an incorrect code section. On encountering such a misprediction, misfetched instructions which are being processed in one or more pipelines must be flushed from the pipelines, and instructions from the correct code section must be fetched and processed through the pipelines.

When flushing instructions from a pipeline, bubbles (or gaps) are injected into the pipeline. Unfortunately, pipeline flushing sometimes makes it necessary to clock a pipeline through several clock cycles before the instruction pipeline can once again produce a useful output. Since conditional branch instructions and other program flow control instructions are prevalent in program code (e.g., sometimes on the order of once every five instructions), the cumulative effect of branch misprediction can have a significant and detrimental impact on a processor's performance, even when branch prediction accuracy is relatively high.

A table of branch prediction history counts can be stored in any one of a number of cache types, including a direct mapped cache, a set-associative cache, and a non-tagged, n-way cache. However, most forms of these caches suffer from cache conflicts and/or aliasing.

Assuming that a cache is designed to store a table of branch prediction history counts, a cache conflict occurs when a count associated with address A and a count associated with address B need to be stored in the same cache entry. Cache conflicts may be reduced by, for example, increasing the size of a cache or implementing the cache as a set-associative cache (i.e., storing tags in a cache) or non-tagged, n-way cache.

Aliasing occurs when an attempt is made to read a count associated with address A from a cache, and instead, a count associated with address B is read from the cache. Aliasing can therefore lead to false hits being generated by a cache (i.e., a hit on data which is not the desired data).

Aliasing typically assumes one of three forms: compulsory aliasing, capacity aliasing or conflict aliasing. Compulsory aliasing occurs when an attempt to read a count associated with address A is made prior to an initialization of the count. One way to mitigate compulsory aliasing is to initialize the entries of a cache to one or more predetermined count values.

Capacity aliasing occurs when a working number of counts which need to be stored in a cache exceeds the number of cache entries which are available for storing the counts. One way to mitigate capacity aliasing is to increase the number of entries in a cache.

Conflict aliasing occurs as a result of a cache conflict. Conflict aliasing can be reduced by, for example, making a cache larger, implementing a cache as a set-associative cache, or implementing a cache as a non-tagged, n-way cache.

In a direct mapped cache of 2-bit counts, each count may be directly addressed by, for example, a number of bits of an instruction pointer. Unfortunately, a direct mapped cache is not a very effective means for storing branch prediction information, since cache conflicts and aliasing can only be reduced by increasing the size of the cache, and chip area for implementing a branch prediction cache is typically very limited.

One alternative to a direct mapped cache of 2-bit counts is a set-associative cache of 2-bit counts. In a set-associative cache, each count is stored with a tag, and a count is addressed by first reading a line of n counts from the cache (i.e., one count from each of the n ways, or a "set" of counts), and then comparing the tag of a requested count with the tags of the n counts which were just read. Cache conflicts can still occur, but the storage of tags helps to keep a cache conflict from leading to conflict aliasing. In fact, aliasing can be eliminated if complete tags are stored with the counts. Complete tags are tags which enable counts to be uniquely addressed. As the size of a tag is decreased, aliasing tends to increase. However, a smaller set-associative cache can achieve results which are comparable to those of a much larger direct mapped cache. One drawback to storing data such as 2-bit counts in a set-associative cache is that tags which are large enough to mitigate aliasing to an acceptable level will typically be much larger than the 2-bit counts which they help to identify. As a result, the data stored in such a cache comprises much more tag information than branch prediction information, and the "overhead":"prediction information" ratio is therefore relatively high.

Another alternative for storing branch prediction information is the non-tagged, n-way cache. Such a cache was proposed by P. Michaud, A. Seznec and R. Uhlig in an article entitled "Trading Conflict and Capacity Aliasing in Conditional Branch Predictors", which was published by the Association for Computing Machinery, Inc. in 1997. The cache redundantly stores a copy of a given count in each of the cache's n ways (e.g., each of three ways), but stores the redundant copies in different sets of indexed locations in each of the n ways. The different sets of indexed locations are generated by index hashing functions which are designed to identify a different set of indexed locations in the cache's n ways for each different address which they receive at their inputs. A cache hit is determined by submitting the address of a count to the n index hashing functions, generating n indexes, reading n indexed counts, and then determining whether a majority of the n counts just read agree (i.e., a hit is determined through voting). If a majority of the counts agree, a hit is signaled and one of the counts in the agreeing majority is output from the cache. Conflict aliasing is minimized on one hand via the index hashing, and on the other hand via the redundancy and voting. For example, consider a 3-way non-tagged cache. If a second count having address_2 overwrites one of the three redundant copies of a first count having address_1, the first count is still considered to exist in the cache if the other two of its three copies still agree. One unique aspect of such a non-tagged, n-way cache is that the advantages of a set-associative cache can be achieved without a need to store tags. Michaud et al.'s article is hereby incorporated by reference for all that it discloses.

Although there are many advantages to Michaud et al.'s cache, the cache still suffers from aliasing due to the fact that the cache holds numerous 2-bit counts, but each of the counts can assume one of only four values (i.e., 00, 01, 10 or 11). As a result, even though different counts are stored in different sets of indexed locations in the cache's n arrays, the fact remains that many of the counts stored in the cache will be the same count, thus increasing the likelihood of false hits. For example, consider the combination of indexes including index_1 in way_1, index_1 in way_2, and index_1 in way_3. Although a count_1 has yet to be written into this combination of indexes, one copy of a count_2 may have been written to index_1 in way_1, one copy of a count_3 may have been written to index_1 in way_2, and one copy of a count_4 may have been written to index_1 in way_3. Since there are only four counts that can be written into the cache, there is a substantial probability that an attempted read of count_1 could result in a cache hit even though count_1 has never been written into the cache. Better methods and apparatus for reducing false hits in a non-tagged, n-way cache are therefore needed.

SUMMARY OF THE INVENTION

The invention comprises a method for reducing false hits in a non-tagged, n-way cache.

In one embodiment of the invention, data values which are provided to a non-tagged, n-way cache are written into the cache in a non-count form. One type of non-count data value which can be written into such a cache is a data value comprising branch prediction history bits.

Although counters tend to quickly saturate to one extreme or the other (e.g., all zeros or all ones), or briefly take on a value which approaches an extreme, non-count data values tend to assume a wider variety of values. Similarly to data hashing, data values that assume a wider variety of values help to reduce false hits from a cache. For example, if a 2-bit counter is saturated at 11 when a branch is all of a sudden not taken, the counter will be decremented to 10. If the branch is then repeatedly taken, the counter will once again saturate at 11 after its next update. However, when two bits of branch prediction history bits are stored in a cache, and a branch is suddenly not taken after a long period of being always taken, the shift of a not taken history bit into the two bit history changes the history bits from 11 to 10. If the branch is then repeatedly taken, the branch history bits change from 10 to 01, and finally to 11 again. The same event therefore produces a wider variety of values when the data stored in a branch prediction cache comprises non-count data. If a 5-bit counter is compared with a 5-bit history, the above discussed event results in no greater change in the 5-bit counter than is seen in the 2-bit counter (each assume two different values). However, the same event produces six combinations of 5-bit histories versus three combinations of 2-bit histories.

BRIEF DESCRIPTION OF THE DRAWINGS

Illustrative and presently preferred embodiments of the invention are illustrated in the drawings in which.

DESCRIPTION OF THE PREFERRED EMBODIMENT

Figure 1:
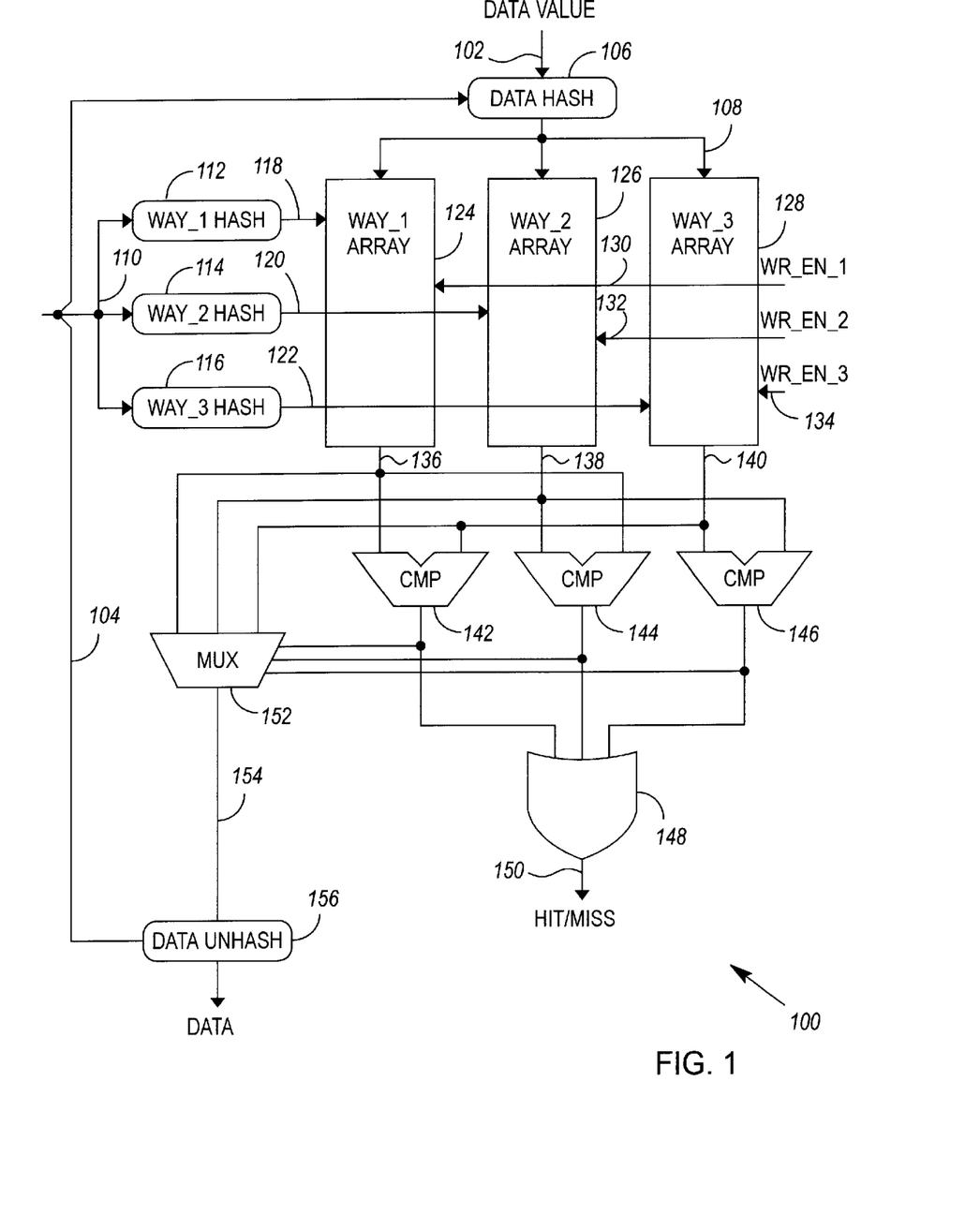
FIG. 1 illustrates an non-tagged, n-way cache which uses data hashing, index hashing and voting to reduce false hits from the cache.
Figure 2:
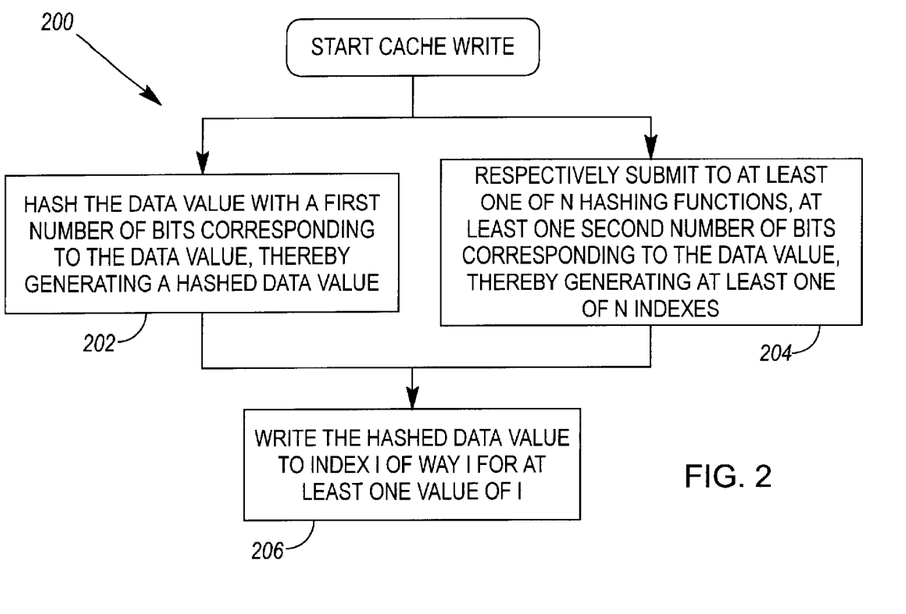
FIG. 2 illustrates a preferred method of writing data values into the FIG. 1 cache.
Figure 3:
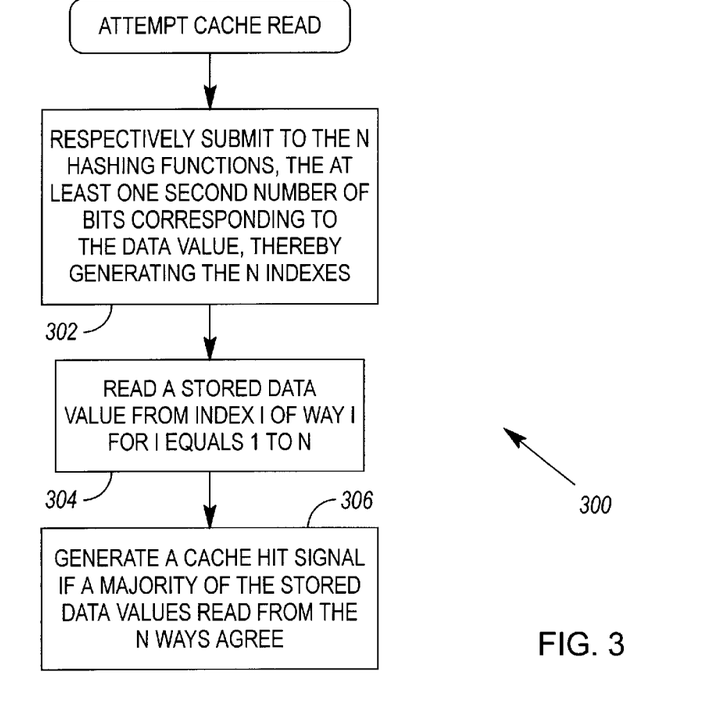
FIG. 3 illustrates a preferred method of reading data values from the FIG.1 cache.

A first method 200, 300 for reducing false hits in a non-tagged, n-way cache 100 with n being greater than 2 (FIG. 1) is generally set forth in FIGS. 2 & 3. A first part of the method 200 (FIG. 2) applies to cache writes, and begins with the hashing 202 of a data value 102 which is to be written into the cache 100 with a first number of bits 104 corresponding to the data value 102, thereby yielding a hashed data value 108. At or about the same time, at least one second number of bits 110 corresponding to the data value 102 is respectively submitted 204 to at least one of n hashing functions 112, 114, 116, thereby generating at least one of n indexes 118, 120, 122. Finally, the hashed data value 108 is written 206 to index i of way i 124, 126, 128 for at least one value of i. A second part of the method 300 (FIG. 3) applies to cache reads. In the second part of the method, the at least one second number of bits 110 corresponding to the data value 102 is respectively submitted 302 to the n hashing functions 112–116, thereby generating the n indexes 118–122. A stored data value 136, 138, 140 is then read 304 from index i of way i 124–128 for i equals 1 to n. If a majority of the stored data values 136–140 read from the n ways 124–128 agree, a cache hit signal 150 is generated 306.

Figure 6:
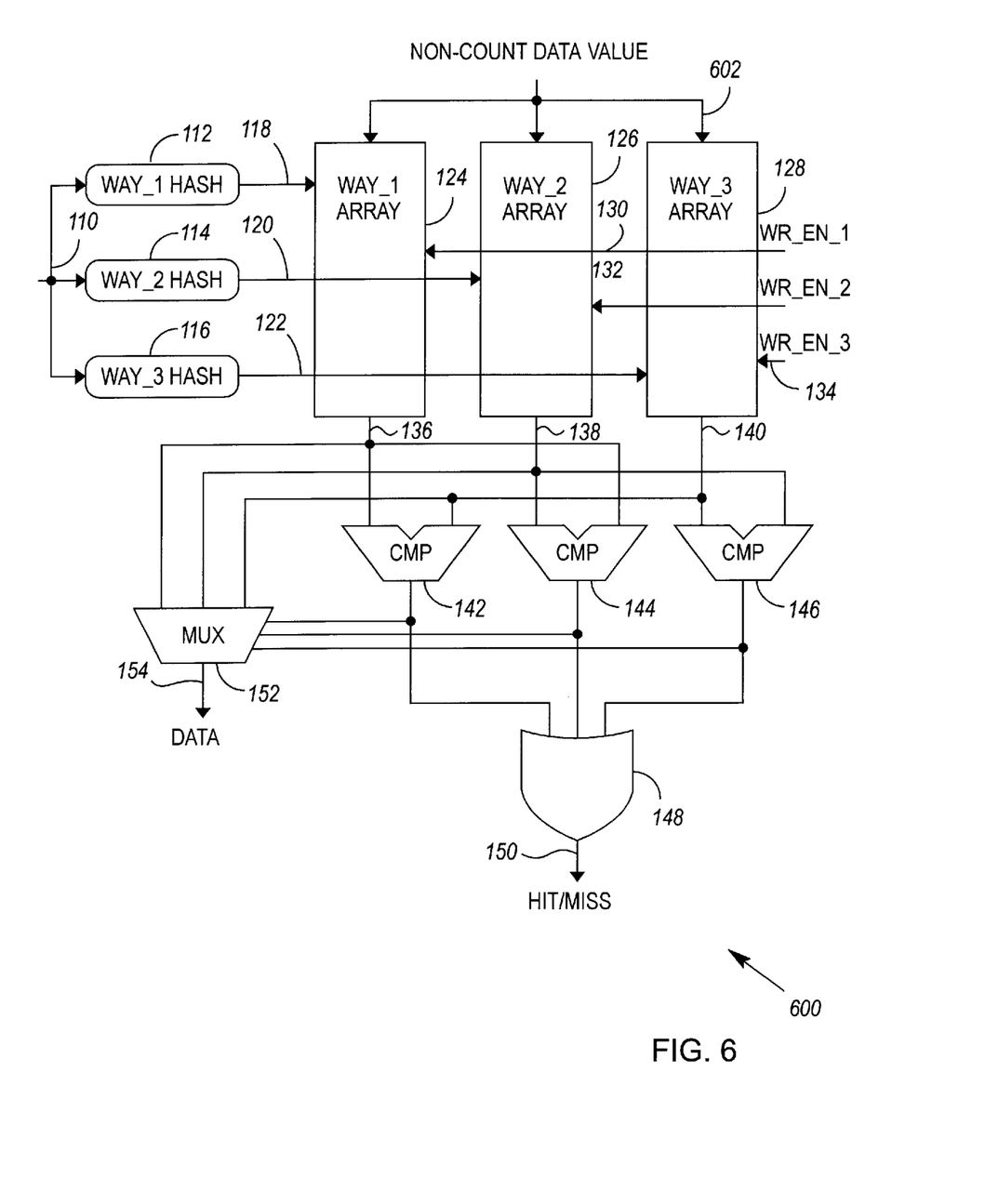
FIG. 6 illustrates a non-tagged, n-way cache in which non-count data values are stored.
Figure 7:
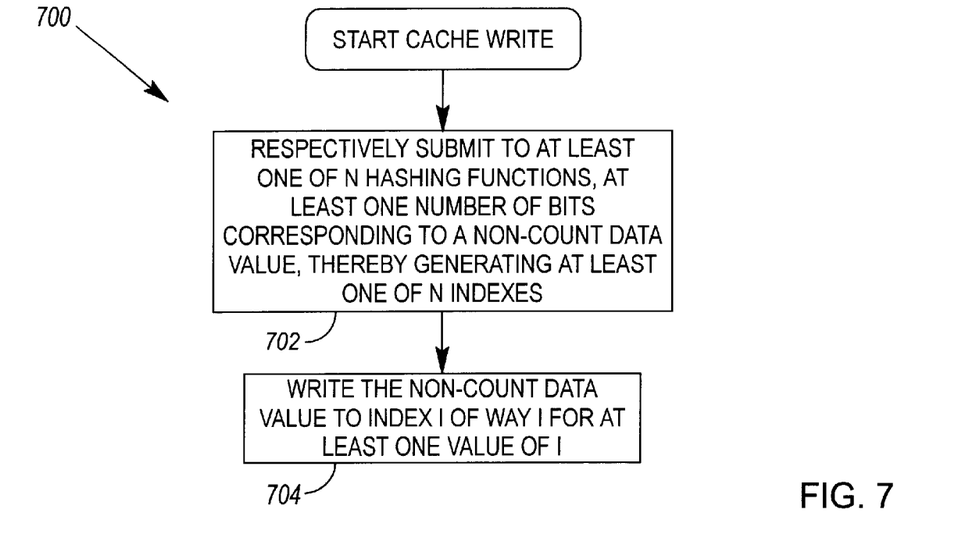
FIG. 7 illustrates a preferred method of writing data values into the FIG. 6 cache.
Figure 8:
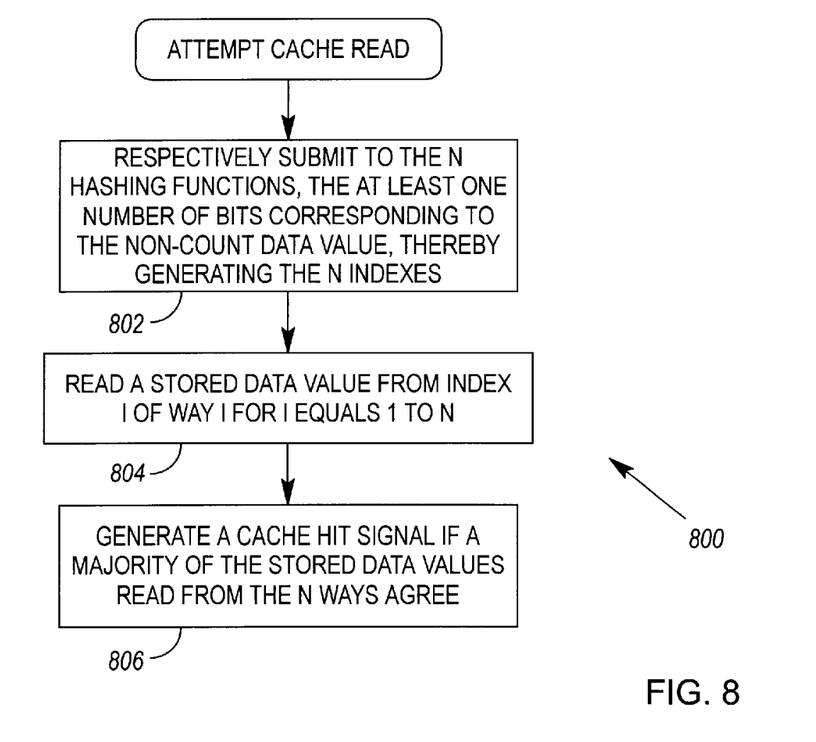
FIG. 8 illustrates a preferred method of reading data values from the FIG. 6 cache.

A second method 700, 800 for reducing false hits in a non-tagged, n-way cache 600 with n once again being greater than 2 (FIG. 6) is generally set forth in FIGS. 7 & 8. A first part of the method 700 (FIG. 7) applies to cache writes. In the first part of the method, at least one number of bits 110 corresponding to a non-count data value 602 is respectively submitted 702 to at least one of n hashing functions 112–116, thereby generating at least one of n indexes 118–122. Thereafter, the non-count data value 602 is written 704 to index i of way i 124–128 for at least one value of i. A second part of the method 800 (FIG. 8) applies to cache reads. In the second part of the method, the at least one number of bits 110 corresponding to the non-count data value 602 is respectively submitted 802 to the n hashing functions 112–116, thereby generating the n indexes 118–122. A stored data value 136–140 is then read 804 from index i of way i 124–128 for i equals 1 to n. If a majority of the stored data values 136–140 read from the n ways 124–128 agree, a cache hit signal 150 is generated 806.

A non-tagged, n-way cache 100 (n>2) which can be used to practically implement the above methods 200, 300, 700, 800 is generally set forth in FIG. 1. The cache 100 comprises n data arrays 124–128, a data hashing circuit 106, n index hashing circuits 112–116, n comparator circuits 142, 144, 146, a logic gate 148 which receives the outputs of the n comparator circuits 142–146 and produces a hit/miss signal 150, and a multiplexing circuit 152. Each of the n data arrays 124–128 comprises a data input, a data output, an address input, and a number of storage locations which are addressed through the address input. The data hashing circuit 106 receives a data value 102 which is to be stored in the cache 100 and hashes it with a first number of bits 104 corresponding to the data value 102, thereby producing a hashed data value 108 to be stored in the cache 100. Each of the n index hashing circuits 112–118 receives a second number of bits 110 corresponding to a data value 102 which is to be stored in or read from the cache 100 and subjects the second number of bits 110 it receives to a different index hashing function to produce an index i 118–122 into data array i 124–128. When a hashed data value 108 is presented to the data input of data array i 124–128 during a cache write, and the index i 118–122 is presented to the address input of data array i 124–128, the hashed data value 108 is written into a storage location of data array i 124–128 which is addressed by index i 118–122 for at least one value of i. When the index i 118–122 is presented to the address input of data array i 124–128 during a cache read, a hashed data value 108 which is addressed by index i 118–122 is read from a storage location of data array i 124–128 for i equals 1 to n. Each of the n comparator circuits 142–146 comprises at least two data inputs which are respectively coupled to the data outputs of at least two of the n data arrays 124–128. Each of the n comparator circuits 142–146 generates an output which is indicative of whether a majority of its data inputs agree. The multiplexing circuit 152 comprises a) data inputs coupled to the data outputs of the n data arrays 124–128, b) control inputs coupled to the outputs of the n comparator circuits 142–146, and c) a cache data output 154.

Having generally described methods 200, 300, 700, 800 and apparatus for reducing false hits in a non-tagged, n-way cache 100, the methods and apparatus will now be described in greater detail.

An exemplary non-tagged, n-way cache 100 with n being equal to three is illustrated in FIG. 1. The cache 100 comprises three data arrays 124–128 (or ways) which are respectively labeled way__1, way__2 and way__3.

As shown in FIG. 1, a data value 102 which is to be stored in the cache 100 is initially provided to a data hashing circuit 106. The data hashing circuit 106 then hashes a data value 102 which it receives with a first number of bits 104 which correspond to the data value 102. Preferably, the bits 104 with which a data value 102 is hashed comprise a number of address bits which correspond to the data value 102 (i.e., a number of bits which are used to address the data value 102 as it is stored in or retrieved from the cache 100). If a data value 102 which is to be stored in the cache comprises branch prediction information, then the first number of bits 104 which correspond to the data value 102 can be a low order portion of a branch instruction's address. Note that the instruction address is associated with a branch instruction which the branch prediction information helps to predict as taken or not taken when a program which comprises the branch instruction is being executed on a computer. Regardless of what type of data is being stored in the cache 100, the data hashing circuit 106 provides a hashed data value 108 to each of the cache's three data arrays 124–128 when data hashing is complete.

In order to complete a write of data 108 into each of the cache's three data arrays 124–128, the data arrays 124–128 must be addressed (or indexed). In FIG. 1, the three data arrays 124–128 are addressed via index hashing. Index hashing is performed by respectively submitting second numbers of bits 110 which correspond to a data value 102 to the three index hashing circuits 112–116. Preferably, the bits 110 which are submitted to the three index hashing circuits 112–116 are address bits. It is also preferable that the bits 110 which are submitted to each of the index hashing circuits 112–116 are the same bits. However, it is conceivable that one could also submit a different combination of bits to each of the three index hashing circuits 112–116.

The bits 110 which are submitted to the index hashing circuits 112–116 do not need to be the same as the bits 104 which are submitted to the data hashing circuit 106. However, the submission of like bits to all of the cache's hashing circuits 106, 112–116 is certainly permissible.

When attempting to read data from the FIG. 1 cache, the second numbers of bits 110 corresponding to a data value 102 which was written into the cache 100 are submitted to the three index hashing circuits 112–116 to thereby generate the three indexes 118–122 into the cache's three data arrays 124–128.

As a stored data value 136–140 is output from each of the cache's three data arrays 124–128, different ones of the data values 136–140 are supplied to three comparators 142–146 in unique pairs. Each of the three comparators 142–146 therefore receives a unique pair of stored data values which it then compares to determine whether the values agree. If any one of the comparators 142–146 determines that its unique pair of stored data values agree, a logic gate 148 such as an OR gate which receives the outputs of the three comparators 142–146 produces a hit signal 150. Otherwise, the logic gate 148 produces a miss signal 150.

At or about the same time, a multiplexing circuit 152 receives the outputs of the three comparators 142–146 at its control inputs and uses the outputs of the three comparators 142–146 to select one of the stored data values 136–140 as a cache data output 154 (that is, assuming that there is a cache hit). If the cache misses, the multiplexing circuit 152 can be designed to output a null value or some other value which is indicative of a cache miss. Alternatively, the output 154 of the multiplexing circuit 152 can merely be ignored.

If the multiplexing circuit 152 produces a cache data output 154, the output must be unhashed from the number of bits 104 that it was hashed with upon entry into the cache 100. A data unhashing circuit 156 is therefore coupled to the output of the multiplexing circuit 152. One skilled in the art will realize that data unhashing can also be performed as stored data values 136–140 are read from the cache 100, or just prior to inputting data values 136–140 into the multiplexing circuit 152. However, it is believed that the most efficient time to perform data unhashing is after the multiplexing circuit 152 has generated a cache data output 154.

Note that the hit mechanism of the FIG. 1 cache 100 is dependent upon data hashing, index hashing, redundancy and voting. For example, when the second number of bits 110 corresponding to a data value 102 is a low order portion of the data value's address, index hashing should insure that each data value having a different low order address portion will be written into a different set of indexes in the cache's three data arrays 124–128. Thus, if a first data value is written into index 0000 in way__1, index 0010 in way__2, and index 1110 in way__3, a second data value which is written into the cache will preferably be written into a different set of indexes (e.g., index 0010 in way__1, index 1100 in way__2, and index 1111 in way__3).

Index hashing should also insure that no two sets of indexes intersect in any more than one way array. Thus, if first and second data values are written into a set of indexes including 0000 in way__1, the two data values should be written into mutually exclusive indexes in way__2 and way__3. As a result, even though sequential writes of the first and second data values into the cache 100 will result in the first data value being overwritten in way__1, the first data value can still be read from the cache 100 due to 1) the exclusivity of its indexes from those of the second data value in way__2 and way__3, and 2) voting.

Although it is within the scope of the invention to relax either of the limitations set forth in the above two paragraphs, doing so increases the probability of aliasing in the FIG. 1 cache 100. Exemplary index hashing circuits which implement the index hashing functions limitations set forth in the above two paragraphs are disclosed in greater in the Michaud et al. article cited supra.

Given that the capacity of the FIG. 1 cache 100 will most likely not be able to simultaneously store every data value which it needs to store, it is likely that all of the storage locations to which a first data value is written will eventually be rewritten with other data values. However, as long as a majority of three storage locations (i.e., those referenced by two or more indexes) hold the same data value, it is presumed that a data value still exists in the cache 100.

In a cache 100 where data values 102 assume only a few different values, or in a cache 100 where many data values 102 which are written to the cache 100 tend to assume one or a small number of values, data hashing helps to reduce false hits by insuring that the same data values 102 will produce different hashed data values 108 when the same data values 102 are associated with different addresses. For example, with respect to branch prediction, it is has been found that many branch instructions are either always taken or always not taken. Thus, data values 102 comprising all zeros (e.g., 000000 for always not taken) or all ones (e.g., 111111 for always taken) tend to dominate the makeup of data values stored in a branch prediction cache. However, since relatively fewer branch instructions have the same low order address bits, the hashing of a data value 102 with six low order address bits 104 which correspond to the data value 102 results in the storage of a wider variety of data values in a branch prediction cache. Thus, data hashing alleviates a major aliasing concern of the Michaud et al. cache structure.

It was previously mentioned that the bits 110 which are submitted to the three index hashing circuits 112–116 of the FIG. 1 cache can be different sets of bits. Although this is not preferred, one must only keep in mind that the index hashing circuits 112–116, as well as the bits 110 which are submitted to the index hashing circuits 112–116, should be designed so that each uniquely addressed data value 102 which is to be written into the cache 100 is associated with a unique set of three indexes 118–122 into the cache's three data arrays 124–128. Furthermore, any two sets of indexes 118–122 should intersect in no more than one array.

Depending on the number of differently addressed data values which need to be written into a cache 100, it will often not be possible to generate a different set of indexes 118–122 for each uniquely addressed data value 102 which needs to be written into the cache 100 (i.e., the size of the cache 100 is likely to be limited by area constraints, and as a result, not all of the bits of a data value's unique address will be submitted to and considered by the index hashing circuits 112–116). However, it is preferable to make every effort to approach such an ideal.

Note that as shown in FIG. 1, it is possible to provide some of the same data bits to both the index hashing circuits 112–116 and the data hashing circuit 106. It is also possible to provide the same bits to each of the hashing circuits 106, 112–116, or to provide completely different bits to the data hashing circuit 106 and the index hashing circuits 112–116. As will be discussed below, the size of a data value 102 stored in the cache 100 will typically be much smaller than an address 110 supplied to the index hashing circuits 112–116, or even the indexes 118–122 supplied to the data arrays 124–128. It is therefore highly likely and even desirable to provide the index hashing circuits 112–116 with more address bits 110 than are provided to the data hashing circuit 106.

The advantages of using index hashing in a non-tagged, n-way cache 100 are discussed in the Michaud et al. article, supra. However, note that the cache proposed by Michaud et al. comprises arrays of 2-bit counters which are incremented or decremented in response to a single bit of information which is indicative of whether a branch instruction was taken or not taken. In the caches 100, 600 illustrated in FIGS. 1 & 6, it is preferable that the cache's data arrays 124–128 actually store non-count data values 602 or hashed data values 108. The arrays 124–128 could also maintain a count such as that disclosed by Michaud et al. However, when storing a count, it is preferable that the count comprise more than 2-bits so that the full effect of data hashing can be realized. When a count is only capable of assuming one of four values, as is the case with a 2-bit count, data hashing provides a very small increase in the diversity of the data stored in a cache, and thus provides little benefit in the way of false hit reduction (and in most cases, it probably provides no benefit). A preferable type of non-count data would be a value which is updated via shifting.

The importance of storing non-count data values in a cache 600 such as that which is illustrated in FIG. 6 will now be discussed. Although counters tend to quickly saturate to one extreme or the other (e.g., all zeros or all ones), or briefly take on a value which approaches an extreme, non-count data values 602 tend to assume a wider variety of values. Similarly to hashed data values 108, data values that assume a wider variety of values help to reduce false hits in a cache 600. For example, if a 2-bit counter is saturated at 11 when a branch is all of a sudden not taken, the counter will be decremented to 10. If the branch is then repeatedly taken, the counter will once again saturate at 11 after its next update. However, when two bits of branch prediction history are stored in a cache 600, and a branch is suddenly not taken after a long period of being always taken, the shift of a not taken history bit into the two bit history changes the makeup of the history bits from 11 to 10. If the branch is then repeatedly taken, the branch history bits change from 10 to 01, and finally, to 11 again. The same change in a branch's taken/not taken history therefore produces a wider variety of values when the data stored in a branch prediction cache comprises non-count data 602.

If a 5-bit counter is compared with a 5-bit history, the above discussed change in a branch's taken/not taken history results in no greater change in the values assumed by a 5-bit counter than is seen in the values assumed by a 2-bit counter (each assume two different values). However, the same branch history produces six combinations of 5-bit histories versus three combinations of 2-bit histories.

Note that the FIG. 1 cache 100 is constructed so that a given hashed data value 108 is written into each of the cache's three data arrays 124–128. However, it is considered to be within the scope of this invention that a hashed data value 108 might only be written into a subset of a cache's data arrays 124–128. Reasons for performing such a selective write will be understood by those skilled in the art, and one skilled in the art should readily understand how to selectively write data into one or more of the cache's data arrays 124–128 using write enable lines 130, 132, 134 or the like. Conditions which might make such a selective write to the three ways 124–128 of a cache are discussed in part in Michaud et al.'s article.

In a preferred embodiment of the FIG. 1 cache 100, a common 20 bits 110 of branch instruction address information are provided to each of the index hashing circuits 112–116, with the index hashing functions implemented by the index hashing circuits 112–116 being the same as those disclosed by Michaud et al. Each of the index hashing circuits 112–116 therefore outputs a 10-bit index 118–122. Also in the preferred embodiment of the FIG. 1 cache 100, six of the less significant address bits 104 which are provided to the index hashing circuits 112–116 are also provided to the data hashing circuit 106. The preferred data hashing function is simply a bitwise exclusive OR between the six address bits 104 and a six bit data value 102. The six bit data value 102 comprises four branch history bits and two additional bits which are irrelevant to this disclosure.

Method FIGS. 2, 3, 7 & 8 have already been discussed. Method FIGS. 4, 5 & 9 respectively illustrate special cases of the methods disclosed in FIGS. 2, 3, 7 & 8 which apply specifically to branch prediction caches.

Figure 4:
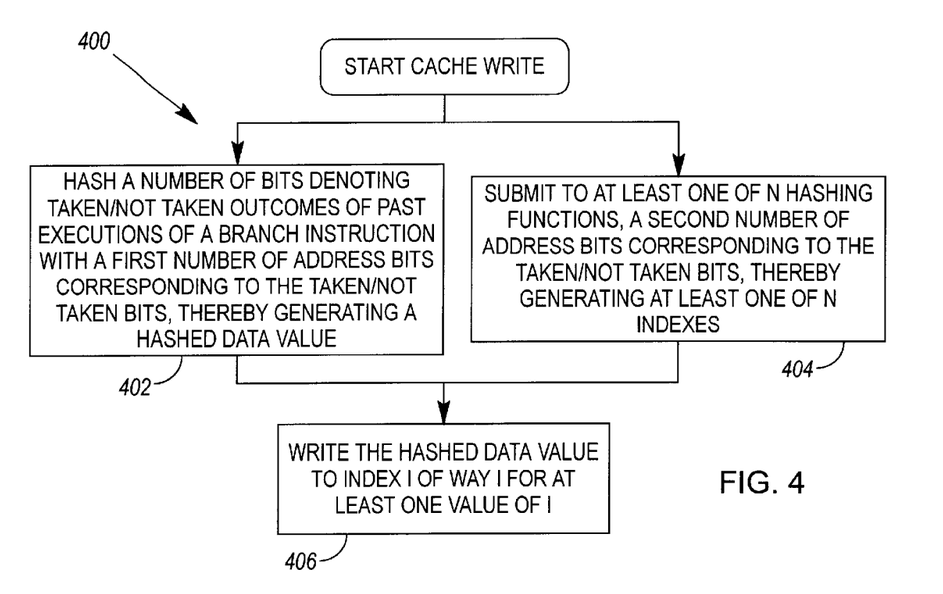
FIG. 4 illustrates a preferred method of writing branch history information into the FIG. 1 cache.

FIG. 4 illustrates a method for writing bits denoting taken/not taken outcomes of past executions of a branch instruction into a branch prediction cache. The taken/not taken bits are first hashed with a first number of address bits which correspond to the taken/not taken bits. A hashed data value is thereby generated. At or about the same time, a second number of bits which correspond to the taken/not taken bits are submitted to at least one of n hashing functions, thereby generating at least one of n indexes. Note that depending on whether data is being written into the cache for the first time, or is being written into the cache in order to update previously written data, all or just some of the data arrays of the cache might be updated. If some data arrays are not being written to, it might be desirable to generate only those indexes which are needed for a given situation (e.g., in order to consume less power). Finally, the hashed data value is written to index i of way i for at least one value of i.

Figure 5:
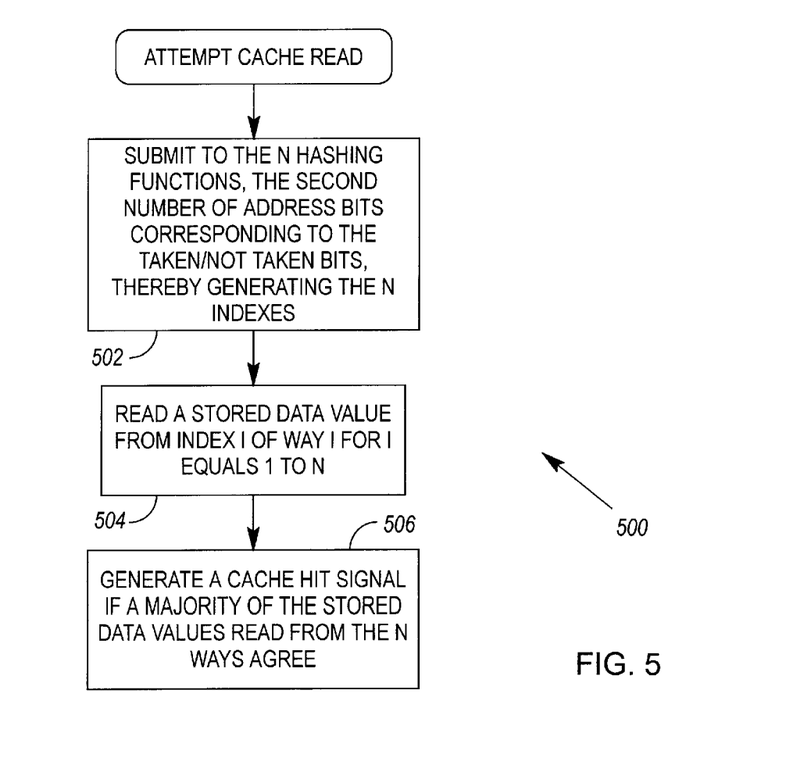
FIG. 5 illustrates a preferred method of reading branch history information from the FIG. 1 cache.

FIG. 5 illustrates a method for reading data from a branch prediction cache. First, the second number of bits which correspond to the taken/not taken bits which are referenced in the preceding paragraph are submitted to each of the n hashing functions to thereby generate each of the n possible indexes. Second, a stored data value is read form index i of way i for i equals 1 to n (i.e., a stored data value is read from each of a cache's n ways). Finally, a cache hit signal is generated if a majority of the stored data values read from the cache agree.

Figure 9:
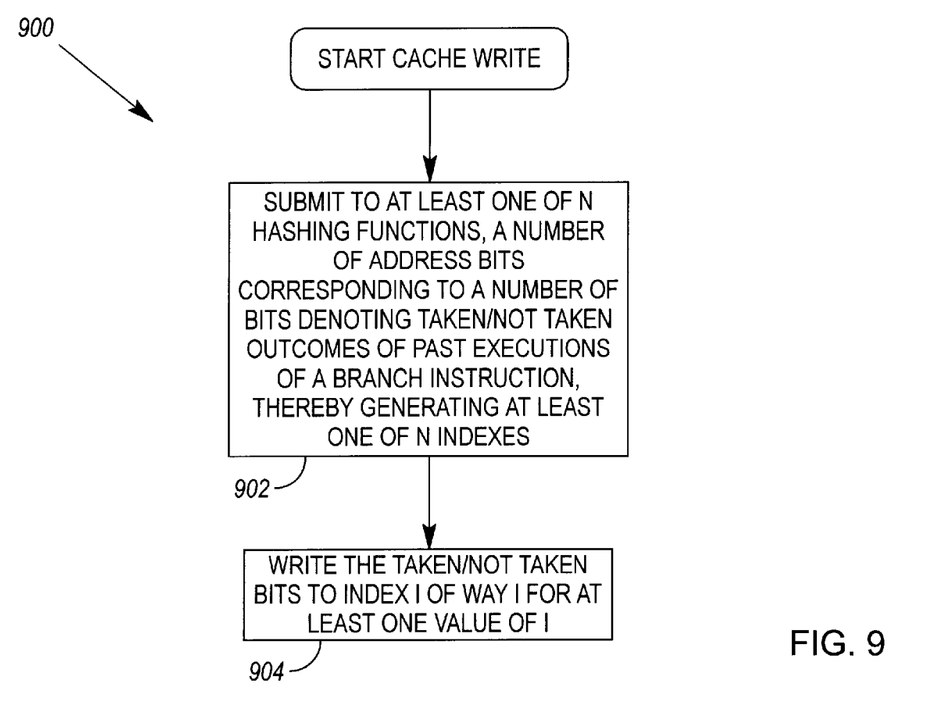
FIG. 9 illustrates a preferred method of writing branch history information into the FIG. 6 cache.

FIG. 9 illustrates an alternative method for writing bits denoting taken/not taken outcomes of past executions of a branch instruction into a branch prediction cache. To begin, a number of bits which correspond to the taken/not taken bits are submitted to at least one of n hashing functions, thereby generating at least one of n indexes. Next, the hashed data value is written to index i of way i for at least one value of i. An attempted read of the just written taken/not taken bits would proceed as described in FIG. 5.

What is claimed is:

1. A method for reducing false hits in a non-tagged, n-way cache, with n being greater than 2, comprising:
 a) when writing a non-count data value into the cache,
  i) respectively submitting to at least one of n hashing functions, at least one number of bits corresponding to the non-count data value, thereby generating at least one of n indexes; and
  ii) writing the non-count data value to index i of way i for at least one value of i; and
 b) when attempting to read the non-count data value from the cache, i) respectively submitting to the n hashing functions, the at least one number of bits corresponding to the non-count data value, thereby generating the n indexes;

ii) reading a stored data value from index i of way i for i equals 1 to n; and iii) if a majority of the stored data values read from the n ways agree, generating a cache hit signal.

2. A method as in claim 1, wherein the at least one number of bits is only one number of bits.

3. A method as in claim 1, wherein the at least one number of bits corresponding to the data value comprises address bits.

4. A method as in claim 3, wherein the at least one number of address bits is only one number of address bits.

5. A method as in claim 1, wherein the representation of the non-count data value is written to index i of way i for i equals 1 to n.

6. A method as in claim 1, wherein the data value comprises prediction information.

7. A method as in claim 6, wherein the prediction information comprises branch history information.

8. A method as in claim 7, wherein the branch history information comprises a number of bits denoting taken/not taken outcomes of past executions of a branch instruction.

* * * * *